United States Patent [19]

Ballain et al.

[11] 4,083,926
[45] Apr. 11, 1978

[54] COOLING ALUMINUM CHLORIDE VAPORS BY CONTACT WITH SOLID ALUMINUM CHLORIDE

[75] Inventors: Marlyn D. Ballain, Belleville, Ill.; Roy E. Hardwick, Maryville, Tenn.; Robert L. Hargis, Palestine, Tex.; Larry K. King, Maryville, Tenn.

[73] Assignee: Aluminum Company of America, Pittsburgh, Pa.

[21] Appl. No.: 765,291

[22] Filed: Feb. 3, 1977

[51] Int. Cl.² ............................ C01F 7/58; C01F 7/62
[52] U.S. Cl. .................................. 423/135; 423/136; 423/495; 423/496
[58] Field of Search ............... 423/135, 495, 136, 496; 55/72, 71

[56] References Cited

U.S. PATENT DOCUMENTS

| | | | |
|---|---|---|---|
| 2,580,635 | 1/1952 | Winter | 55/72 |
| 3,446,579 | 5/1969 | Toomey et al. | 423/495 |
| 3,694,170 | 9/1972 | Fryii et al. | 423/495 |
| 3,786,135 | 1/1974 | King et al. | 423/135 |
| 3,878,293 | 4/1975 | Piccolo et al. | 423/495 |
| 3,929,975 | 12/1975 | King et al. | 423/496 |
| 3,930,800 | 1/1976 | Schoener et al. | 423/495 |
| 3,956,455 | 5/1976 | King et al. | 423/495 |
| 4,029,750 | 6/1977 | Schoener et al. | 423/495 |

Primary Examiner—Herbert T. Carter
Attorney, Agent, or Firm—John P. Taylor

[57] ABSTRACT

Hot vapors of aluminum chloride and by-products produced in the chlorination of aluminous material to form aluminum chloride are cooled by contacting the vapors with solid aluminum chloride as the vapors exit from the reactor and before the vapors come in contact with filter materials. This cooling reduces the temperature of the vapors from an initial temperature of about 600°–800° C down to about 300°–350° C thereby preventing or inhibiting attack of the filter materials by the hot vapors.

6 Claims, 2 Drawing Figures

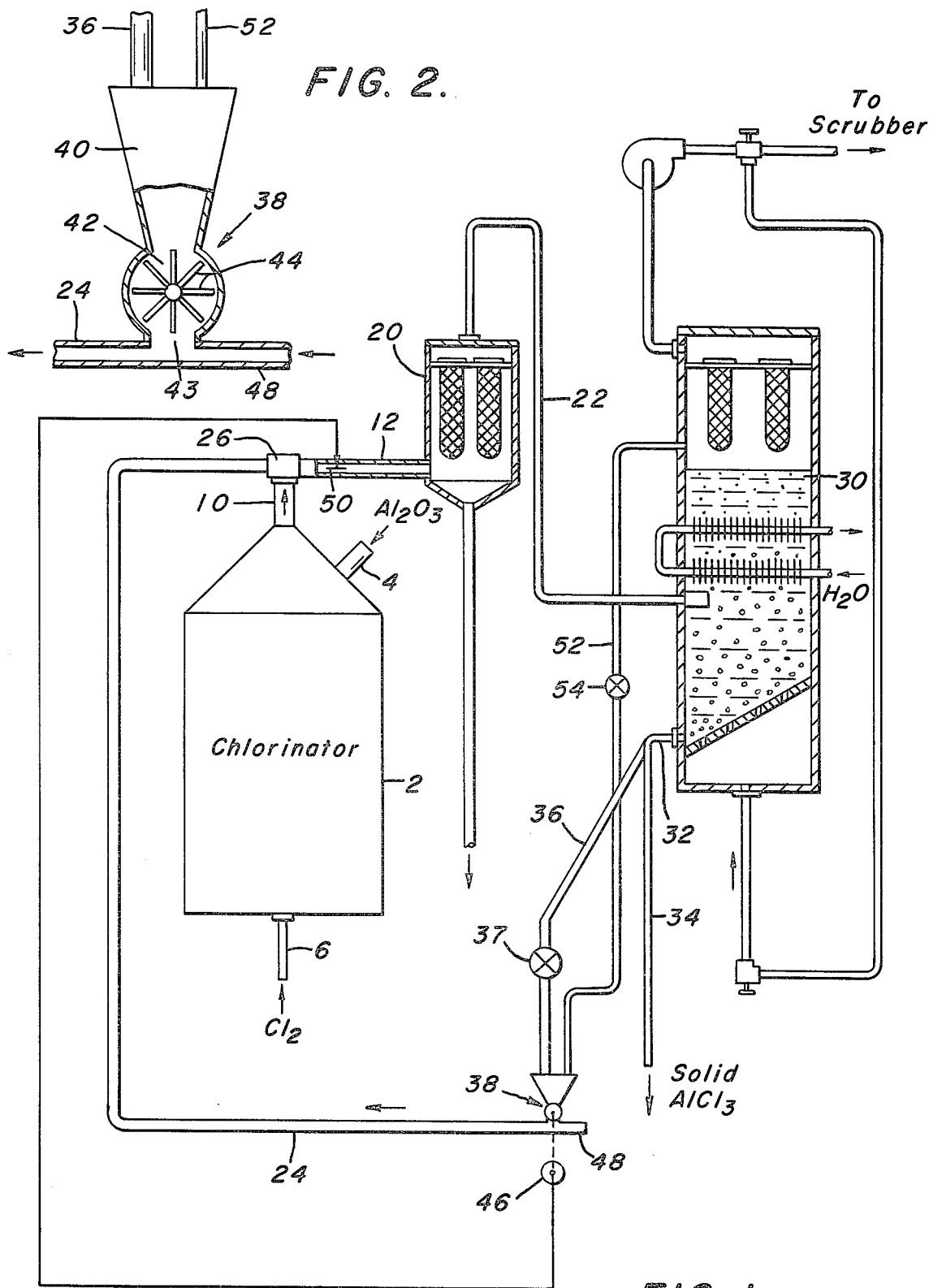

COOLING ALUMINUM CHLORIDE VAPORS BY CONTACT WITH SOLID ALUMINUM CHLORIDE

BACKGROUND OF THE INVENTION

This invention relates to the production of aluminum chloride of a purity suitable for subsequent electrolytic reduction to metallic aluminum. More particularly, this invention relates to the cooling of aluminum chloride vapors produced during the chlorination of aluminous material to produce high-purity aluminum chloride.

The process of producing aluminum chloride by chlorination of an aluminous material, such as aluminum oxide, as described and claimed in King et al U.S. Pat. No. 3,786,135, involves the filtration of the gaseous effluent emanating from the chlorination vessel. These vapors include aluminum chloride vapors and may, initially, be at temperatures as high as 600°–800° C. Such temperatures are much too high for the filtration equipment which must be used to remove impurities such as entrained solids from the gases. It is therefore necessary to cool the gases down to a temperature which can be successfully withstood by the filtration equipment.

In the aforesaid King et al. patent the vapors are shown as passing through a cooler having a jacket through which a suitable coolant is flowed. While this has been found to be satisfactory, it does involve regulation of the cooling to avoid plugging of the cooler and requires use of additional energy and resultant expense in providing the coolant for this cooler.

SUMMARY OF THE INVENTION

In accordance with the invention, hot vapors produced by the chlorination of an aluminous material are cooled by contacting the vapors as they emanate from the reactor with solid aluminum chloride. The solid aluminum chloride is vaporized by the heat from the hot gases and this vaporization utilizes sufficient energy to cool the gases down to a temperature of about 300°–350° C which is a satisfactory working temperature range for subsequent filtration equipment.

BRIEF DESCRIPTION OF THE DRAWINGS

FIG. 1 is a schematic view of a reaction vessel and associated apparatus used in carrying out the process of the invention.

FIG. 2 is an enlarged fragmentary portion of the process loop in FIG. 1, particularly illustrating the mechanism for transporting the solid aluminum chloride back to the exit of the reaction vessel.

DESCRIPTION OF THE INVENTION

Referring now to the drawings, a chlorination vessel is shown at 2 into which an aluminous material such as aluminum oxide is fed through a port 4 while chlorine gas is bubbled in through entryway 6. Hot gases including aluminum chloride vapors exit from the chlorinator 10 from which they pass via line 12 to a filter station 20 wherein solids are separated from the hot vapors. The filtered aluminum chloride vapors then travel via line 22 to a fluidized bed 30 such as described and claimed in the aforesaid King et al patent which briefly comprises fluidized solid aluminum chloride particles on which the aluminum chloride vapors entering from line 22 can condense or desublime. Solid aluminum chloride then is removed in particulate form at line 32.

In accordance with the invention, a portion of the solid aluminum chloride removed from fluidized bed 30 is injected into the reactor off-gas stream. This can be accomplished as shown in the drawing by dividing the flow of solid aluminum chloride particles from fluidized bed 30 into two streams respectively via lines 34 and 36, with line 36 feeding the aluminum chloride into a metering system such as rotary valve 38 as will be described below. Alternatively, the aluminum chloride particles to be fed back to chlorinator 2 can be removed from fluidized bed 30 via an independent exit port.

Turning now to FIG. 2, rotary valve 38 is shown in more detail comprising a reservoir portion 40 into which the aluminum chloride falls from line 36. From reservoir 40 the aluminum chloride particles pass into chamber 42 in which rotary vane 44 turns at a speed controlled by a dc motor 46 (shown in FIG. 1). The speed of the motor is in turn controlled by a thermocouple 50 (shown in FIG. 1) placed in line 12 to monitor the temperature of the aluminum chloride vapors exiting from chlorinator 2. As the temperature of the aluminum chloride vapors increases, the thermocouple senses the increase in temperature causing motor 46 to increase its speed to feed a larger amount of solid aluminum chloride via line 24 to line 12 to, in turn, reduce the temperature of the aluminum chloride vapors.

As rotor 44 turns in valve 38, aluminum chloride drops out of the rotary valve into a turbulent stream of anhydrous gas entering chamber 43 via line 48. The gas may be an inert gas such as nitrogen or may be an off-gas from fluidized bed 30 which would contain carbon monoxide, carbon dioxide, hydrogen chloride, phosgene and chlorine. Alternatively, any one of these gases could be used as an independent source of the transport gas since subsequent equipment (forming no part of the present invention) is designed to treat these particular gases as the conventional off-gases resulting from the chlorination reaction in chlorination vessel 2. The flow of transport gas may be maintained via compressors, valves and regulators as is well known to those skilled in the art.

In accordance with the invention, solid aluminum chloride particles passing into rotary valve 38 from line 36 are fluidized with gas from 48 and passed via line 24 to mixing point 26 where they are vaporized in line 12 thereby removing heat from the vapors passing along line 12 to reduce the temperature from about 600°–800° C down to about 300°–350° C before the vapors pass into filter vessel 20.

From the standpoint of the ratio of solid aluminum chloride to the vapors, it has been found that from about 1–2 kilograms of solid aluminum chloride powder should be recycled for each kilogram of aluminum chloride generated in the reactor. While the actual size of the aluminum chloride particles is not deemed to be critical, the preferred size range is from about 4–25 microns. It is believed that the smaller particle sizes may vaporize more quickly. However, the particle size range used will depend on the operating variables of fluidized bed 30. Obviously, it is desired that the particles in line 12 vaporize prior to entry into filter 20 to provide the desired heat exchange before the vapors are exposed to the filters in filter 20 as well as to prevent any blocking of the filters via solid aluminum chloride particles entering into filter 20. It has been found that larger particles drop to the bottom of fluidized bed 30 due to their weight in the fluidized bed therein. Thus, if one desires to control the size of the particles to be fed back to the exit port of chlorinator 2, one can readjust the position in fluidized bed 30 from which the particles are tapped to return to the chlorinator. The higher one places the exit port in fluidized bed 30, the smaller the particle size range will be. However, it may be advantageous to locate the exit port adjacent the bottom of fluidized bed 30 to remove the largest particles to enhance operation of the fluidized bed.

Turning again to FIG. 2, additional line 52 is shown running between the top or gaseous portion of fluidized bed 30 and rotary valve 38. This line provides a vent to equalize the pressure between fluidized bed 30 and valve 38 should any pressure differentials develop which prevent proper flow of the particles in line 36 from fluidized bed 30 to rotary valve 38. If such stoppage does occur, valve 54 in line 52 can be opened to equalize the pressure and thus permit the flow to continue.

An additional valve 37 is illustrated in line 36 which may be used in the event of a shut off of rotary valve 38 to prevent caking of the aluminum chloride particles in line 36 below valve 37, in reservoir 40 or between vanes 44 should valve 38 be shut off for a particular reason. If valve 38 is to be shut down, valve 37 is first closed thereby permitting all of the aluminum chloride particles in reservoir 40 and in line 36 below the valve 37 to pass through valve 38 to line 24. Rotary valve 38 may then be shut down without any aluminum chloride particles present therein in sufficient quantities to sift down into the gas-solids mixing box 43 below the rotary valve and prevent proper start-up subsequently.

It should be further noted that the object of the invention to cool the exit vapors of aluminum chloride emanating through line 10 from chlorinator 2 may be accomplished by feeding aluminum chloride particles from a reservoir independent of the desublimer. In this regard it should be noted that off grade aluminum chloride can be utilized such as, for example, aluminum chloride which does not possess the requisite purity required for a cell wherein the aluminum chloride is electrolytically reduced to produce metallic aluminum. Impure aluminum chloride can be used to provide cooling in accordance with the invention because it will be revaporized and will be exposed to chlorination reactor off-gases as well in line 12. The aluminum chloride values in the impure product can therefore be extracted while the impurities (if solids) will be entrained in the filter medium while the vaporous impurities will be sufficiently diluted by pure aluminum chloride vapors to bring the resultant product desublimed in fluidized bed 30 within the required specifications for the subsequent electrolytic reduction process.

Having thus described the invention, what is claimed is:

1. In an improved process for the production of high-purity aluminum chloride suitable for electrolytic reduction to metallic aluminum by the chlorination of aluminous material to produce aluminum chloride at a temperature above the vaporization point of aluminum chloride followed by filtration of the aluminum chloride vapors and subsequent condensation of the aluminum chloride vapors in a fluidized bed, the improvement which comprises: contacting the hot aluminum chloride vapors with sufficient solid aluminum chloride particles recycled by a fluidizing gas, after condensation in the fluidized bed back to a point located between a chlorination zone and a filtration zone to cool the vapors by vaporization of the solid aluminum chloride to a temperature of about 300°–350° C to permit subsequent filtration of the aluminum chloride vapors to remove solid impurities therefrom.

2. The process of claim 1 wherein a metering system controls the amount of aluminum chloride particles transported back to said point between said chlorination zone and said filtration zone.

3. The process of claim 2 wherein said metering system includes a rotary valve.

4. The process of claim 3 wherein the temperature at said point is monitored by a thermocouple which controls the speed of said rotary valve to feed an increased amount of aluminum chloride to said point in response to an increase in temperature and to decrease the amount fed to said point in response to a decrease in temperature beyond a range of 300°–350° C.

5. The process of claim 1 wherein 1–2 kilograms of solid aluminum chloride particles are recycled back to said point for each kilogram of aluminum chloride generated in said chlorination zone.

6. The process of claim 5 wherein said recycled particles have a size range of 4–25 microns to permit quick vaporization.

* * * * *